US008412495B2

(12) United States Patent
Boretzki

(10) Patent No.: US 8,412,495 B2
(45) Date of Patent: Apr. 2, 2013

(54) FITTING PROCEDURE FOR HEARING DEVICES AND CORRESPONDING HEARING DEVICE

(75) Inventor: Michael Boretzki, Rueti (CH)

(73) Assignee: Phonak AG, Stafa (CH)

( * ) Notice: Subject to any disclaimer, the term of this patent is extended or adjusted under 35 U.S.C. 154(b) by 490 days.

(21) Appl. No.: 12/674,985

(22) PCT Filed: Aug. 29, 2007

(86) PCT No.: PCT/EP2007/058961

§ 371 (c)(1), (2), (4) Date: Feb. 24, 2010

(87) PCT Pub. No.: WO2009/026959

PCT Pub. Date: Mar. 5, 2009

(65) Prior Publication Data

US 2011/0106508 A1 May 5, 2011

(51) Int. Cl.
*G06F 7/60* (2006.01)

(52) U.S. Cl. ................ 703/2; 361/58; 361/60; 361/312; 379/52

(58) Field of Classification Search .................. 704/233; 381/314, 60, 312, 316, 315, 23.1, 58; 703/2; 379/52

See application file for complete search history.

(56) References Cited

U.S. PATENT DOCUMENTS

| | | | | |
|---|---|---|---|---|
| 5,303,306 | A | 4/1994 | Brillhart et al. | |
| 6,175,635 | B1 | 1/2001 | Meyer et al. | |
| 7,231,055 | B2 * | 6/2007 | Uvacek et al. | 381/312 |
| 2004/0071304 | A1 | 4/2004 | Yanz et al. | |
| 2004/0190739 | A1 * | 9/2004 | Bachler et al. | 381/314 |
| 2004/0240693 | A1 | 12/2004 | Rosenthal | |
| 2005/0114127 | A1 * | 5/2005 | Rankovic | 704/233 |
| 2008/0298600 | A1 * | 12/2008 | Poe et al. | 381/60 |
| 2010/0098276 | A1 * | 4/2010 | Frohlich et al. | 381/314 |
| 2010/0111338 | A1 * | 5/2010 | Ypma et al. | 381/314 |

OTHER PUBLICATIONS

International Search Report for PCT/EP2007/058961 dated May 28, 2008.

Written Opinion for PCT/EP2007/058961 dated May 28, 2008.

* cited by examiner

*Primary Examiner* — Saif Alhija
*Assistant Examiner* — Cuong Luu
(74) *Attorney, Agent, or Firm* — Pearne & Gordon LLP

(57) ABSTRACT

The method for adjusting a hearing device (11) to the hearing preferences of a user of the hearing device comprises a) adjusting at least one of N parameters (P1, P2), preferably with 2≦N≦4;

b) obtaining a gain model (G), which is identical with the output of a fitting rationale (F) applied to a model audiogram (A), wherein the model audiogram depends on the N parameters and is independent of possibly existing audiogram values measured for the user; and c) using the gain model (G) or a gain model derived therefrom in said hearing device (11).

Preferably, the model audiogram (A) is an approximation to an audiogram occurring in a pre-defined empirical sample of individual audiograms. The user preferably carries out the method by himself and without external equipment. A corresponding arrangement (1) is disclosed, too. A simple and efficient hearing device fitting can be achieved.

15 Claims, 2 Drawing Sheets

FITTING PROCEDURE FOR HEARING DEVICES AND CORRESPONDING HEARING DEVICE

TECHNICAL FIELD

The invention relates to the field of hearing devices and in particular to the fitting of hearing devices, i.e., to adjusting a hearing device to the hearing preferences of a user of said hearing device. It relates to methods, apparatuses and computer program products according to the opening clauses of the claims.

Under a hearing device, a device is understood, which is worn in or adjacent to an individual's ear with the object to improve the individual's acoustical perception. Such improvement may also be barring acoustic signals from being perceived in the sense of hearing protection for the individual. If the hearing device is tailored so as to improve the perception of a hearing impaired individual towards hearing perception of a "standard" individual, then we speak of a hearing-aid device. With respect to the application area, a hearing device may be applied behind the ear, in the ear, completely in the ear canal or may be implanted.

A hearing system comprises at least one hearing device. In case that a hearing system comprises at least one additional device, all devices of the hearing system are operationally connectable within the hearing system. Typically, said additional devices such as another hearing device, a remote control or a remote microphone, are meant to be worn or carried by said individual.

BACKGROUND OF THE INVENTION

The most common way of fitting a hearing device, i.e., adjusting a hearing device to the preferences of a user of said hearing device, involves using a personal computer external to the hearing device and further equipment for measuring an audiogram of said user and calculating, on basis of the audiogram, a gain model to be used for this user, wherein a gain model represents the basic amplification characteristic in dependence of input level and frequency. This gain model is used at least as a first fit. Typically, later, some fine-tuning will take place, based upon said gain model, so as to further improve the gain model for improving the user's hearing sensation.

Said audiogram is unique for each user, and obtaining it involves in many cases a precise determination of the user's hearing loss for many frequencies. The whole procedure of measuring the audiogram is carried out by a hearing device professional such as an audiologist.

The determination of the gain model is carried out using a specific algorithm, also referred to as fitting algorithm or fitting rationale, such as NAL-NL1, DSL-i/o and Phonak Digital. After all required audiogram data are taken and entered, the corresponding calculation is started.

When the gain model is finally determined, it will be transmitted to the hearing device. Possibly after another command, the transmitted gain model (typically represented by several data, in particular parameter settings) will be used in the hearing device, and the hearing device user finally can experience the perception of environmental sound when the newly obtained gain model is working.

From EP 1 617 705 A2, a hearing device is known, which can be fitted in-situ by the hearing device user. The hearing device plays test sounds to the user, which are known to the user from everyday life, and the user uses the hearing device's volume wheel for adjusting each test sound to comfortable audibility. Having made such adjustments for several test sounds, new parameter settings are calculated and used.

From U.S. Pat. No. 4,947,432, a hearing system comprising a hearing-aid device and a remote control is known, wherein it is provided that the remote control transmits data to the hearing-aid device, which—when received in the hearing-aid device—are used for adjusting the transmission characteristics of the hearing device.

From U.S. Pat. No. 6,175,635 B1, it is known to use one user control of a hearing device for simultaneously setting several audiological/acoustical parameters of a signal processor of the hearing device.

From U.S. Pat. No. 5,202,927, it is known to adjust the transmission characteristic between microphone and earphone of a hearing device by measuring an audiogram of the hearing device user and inputting one-by-one the so-obtained audiometric data into a remote control of the hearing device. The audiometric data can relate to the hearing device user's hearing loss at different discrete frequencies. When the whole audiogram, i.e. all said audiometric data, is entered into the remote control, the data are transmitted to the hearing device. In the hearing device, the data are used for adjusting the processing.

From U.S. Pat. No. 5,303,306, a method for configuring a hearing-aid device is known, in which an audiologist performs conventional audiometry by gathering audiogram data, e.g., a standard pure tone air conduction audiogram. From the so-obtained audiogram, the audiologist determines manually, using pre-defined overlays, two values characterizing the audiogram: a value describing the curve shape of the audiogram and a value the magnitude of hearing loss of the user. These two values are entered into a remote control of the hearing-aid device by setting dip switches. In the remote control, the dip switch settings are used to generate baseline settings for the hearing device circuitry.

It is desirable to provide for an alternative way of fitting a hearing device.

SUMMARY OF THE INVENTION

Therefore, one object of the invention is to create an alternative way of adjusting a hearing device to the hearing preferences of a user of said hearing device. In particular, a method for adjusting a hearing device to the hearing preferences of a user of said hearing device, and a corresponding hearing system, and a corresponding computer program product shall be provided.

Another object of the invention is to provide for a way of adjusting a hearing device to the hearing preferences of a user, which can easily be carried out by said user himself, in particular without or substantially without the help of a professional hearing device fitter.

Another object of the invention is to provide for a way of adjusting a hearing device to the hearing preferences of a user, which can be carried out solely with the hearing device or with the hearing system to which the hearing device belongs, without the need of additional means.

Another object of the invention is to provide for a way of adjusting a hearing device to the hearing preferences of a user, which is simple to carry out and does not require a particular expertise.

Another object of the invention is to provide for a way of adjusting a hearing device to the hearing preferences of a user, which is easily implementable.

Another object of the invention is to provide for a way of adjusting a hearing device to the hearing preferences of a user, which can be carried out even if no personal computer or special, in particular audiological equipment is available.

Another object of the invention is to provide for a way of adjusting a hearing device to the hearing preferences of a user, which does not require the generation of special test sounds.

Another object of the invention is to provide for a way of adjusting a hearing device to the hearing preferences of a user, which can be carried out within a relatively short period of time.

Another object of the invention is to provide for a way of adjusting a hearing device to the hearing preferences of a user, which needs little storage space in the hearing device or hearing system.

Another object of the invention is to provide for a way of adjusting a hearing device to the hearing preferences of a user, which needs little processing power in the hearing device or hearing system.

Another object of the invention is to provide for a way of adjusting a hearing device to the hearing preferences of a user, which can be accomplished without measuring an audiogram for the user.

Further objects emerge from the description and embodiments below.

At least one of these objects is at least partially achieved by apparatuses and methods according to the patent claims.

The method for adjusting a hearing device to the hearing preferences of a user of said hearing device comprises the steps of a) adjusting at least one of N parameters;

b) obtaining a gain model, which is identical with the output of a fitting rationale applied to a model audiogram, wherein said model audiogram depends on said N parameters and is independent of possibly existing audiogram values measured for said user.

The arrangement for adjusting a hearing device to the hearing preferences of a user of said hearing device comprises said hearing device;

at least one user control for adjusting N parameters;

a control unit adapted to obtaining a gain model usable in said hearing device, which is identical with the output of a fitting rationale applied to a model audiogram, wherein said model audiogram depends on said N parameters and is independent of possibly existing audiogram values measured for said user.

The computer program product for adjusting a hearing device to the hearing preferences of a user of said hearing device comprises program code for causing a computer to perform the steps of A) receiving user input indicative of a requested adjustment of N parameters;

B) obtaining a gain model, which is identical with the output of a fitting rationale applied to a model audiogram, wherein said model audiogram depends on said N parameters and is independent of possibly existing audiogram values measured for said user.

Through this, an efficient way of fitting a hearing device can be provided.

The expression "possibly existing audiogram values measured for said user" means that there may exist audiogram values that have been measured for said user, but as well it is possible that there may never have been carried out any audiogram value measurements for said user. I.e., independent of there existing any audiogram values measured for said user or not: even if audiogram values measured for said user exist, said model audiogram will be independent of those. Accordingly, for obtaining said model audiogram, it is not required to measure audiogram values for said user.

Typically, at least two of the N parameters are continuous or quasi-continuos parameters. In case of quasi-continuos parameters, each parameter typically can assume one of at least 10 or 20 or 30 possible different values and up to 100 or 80 or 60 possible different values.

Typically, step b) is carried out in dependence of said N parameters.

Usually, each of said N parameters is different from an audiogram parameter.

Audiogram values are, e.g., hearing threshold values, most comfortable levels (MCL) or other audiological values contributing to an audiogram of a specific user.

Usually, step b) is carried out independently of possibly existing audiogram values measured for said user.

The inventor recognized the great value that is contained in fitting rationales. And the inventor furthermore found out that a reasonable first fit of a hearing device can be achieved based on an audiogram which does not fully but only approximately agree with an audiogram measured for the individual user of the hearing device.

Said adjusting of a parameter can also be termed selecting a setting of the parameter, i.e. selecting a parameter setting.

By means of adjusting said N parameters, a gain model can be determined, which is at least approximately identical with a gain model that can be obtained by applying a certain fitting rationale to a model audiogram. When a reasonable fit of the hearing device, more precisely: of the gain model used in the hearing device of the user, is achieved, it is likely that said model audiogram approximately corresponds to an audiogram, which would be measured for said user.

It shall be pointed out that gain models are typically represented in form of data representative of a gain model, such as parameters for a signal processor. Therefore, the term "gain model" may occasionally be used, when, more strictly spoken, "data representative of a/the/said gain model" is meant. A similar remark applies to audiograms and fitting rationales mentioned in this application.

In one embodiment, step b) is carried out automatically after step a). Preferably, there is no unnecessary time delay before starting step b), may be even no extra button pressing or another action initiating step b) besides adjusting at least one of said N parameters.

Preferably, it takes at most 4 seconds, preferably at most 2 seconds, more preferably at most 1 second after step a) is finished, before step b) is finished.

In one embodiment, the method comprises the step of c) using said gain model or a gain model derived therefrom in said hearing device.

Preferably, there is no unnecessary time delay before starting step c) after step b) is finished.

In one embodiment, step c) is carried out automatically after step b)

These embodiments can contribute to enabling the method to be carried out in real-time; i.e. with only little delay and/or no further actions after carrying out an adjustment of at least one of said N parameters, the user will be able to perceive sound processed using the newly-obtained gain model.

Preferably, the time span between finishing step a) and starting step c) is 3 seconds or less, in particular 1.5 seconds or less.

In one embodiment, $2 \leqq N \leqq 4$ applies. The inventor found that one parameter will usually not be sufficient for achieving in a simple way a good fit for most users. The inventor furthermore found that five or more parameters will usually tend to make the method too complicated for users. Even four parameters can, for several users, be too much to cope with. Three parameters can usually be handled by many users, and good fitting results can be achieved. Nevertheless, it has been found that not only is the handling of only two parameters particularly easy, but also the definition of the two parameters can be accomplished in such a way, that for most users, a well-suiting gain model can be selected.

In one embodiment, said model audiogram is an approximation to an audiogram occurring in a pre-defined empirical sample of individual audiograms. Empirical samples of individual audiograms are available, e.g., from universities or hospitals. Such empirical samples of individual audiograms comprise typically at least 1000, at least 5000 or at least 12000 or even more audiograms of individuals. It is possible to find a set of parametrized functions, which provide a reasonable fit to most of the audiograms in the empirical sample. I.e. by means of such parametrized functions, most of said audiograms in the empirical sample are well-approximated, wherein the choice of parameters determines exactly what each function looks like. These functions are the model audiograms referred to before and later on. Each model audiogram is accessible by a certain setting of the parameters. The number of parameters can be chosen when searching the set of parametrized functions.

In one embodiment, a definition of at least one, in particular of each of said N parameters is derived based upon a statistical analysis of said pre-defined empirical sample of individual audiograms. Such a statistical analysis may comprise factor analysis or other means and algorithms.

Note that it is stated in the description of this embodiment, that the definition of the parameters is derived based upon a statistical analysis, which shall not be confused with the parameter setting (value) resulting from the parameter adjustment in step a). The definitions of the parameters describe, how a model audiogram is obtained in dependence of said parameter.

In one embodiment, step b) comprises the steps of b1) obtaining said model audiogram;

b2) applying said fitting rationale to said model audiogram.

This is one way of carrying out step b). As an intermediate result, said model audiogram is obtained, e.g., as a set of typically 10 to 20 hearing loss values or most-comfortable levels; and then, a selectable or typically prescribed fitting rationale is applied to the model audiogram, so as to obtain the sought gain model.

Step b1) can be considered a carrying-out of a certain algorithm or prescribed calculation or function in dependence of the settings of the N parameters. Step b2) can be considered a carrying-out of a certain algorithm or prescribed calculation or function in dependence of the model audiogram. The fitting rationale can, e.g., be provided as a function, numerically, or as a look-up table.

Using a look-up table has the great advantage that steps b) and b2) can be carried out particularly fast.

In one embodiment, step b) comprises the step of b3) obtaining data from a look-up table.

Not only the fitting rationale can be provided in form of a look-up table, but it is also possible to obtain the model audiogram from a look-up table, in dependence of the N parameters. And it is also possible to provide all possible gain models as look-up tables.

In one embodiment, step a) is carried out by said user.

In one embodiment, the method is carried out using solely devices of a hearing system to which said hearing device belongs. This makes additional equipment superfluous.

In one embodiment, the arrangement is comprised in a hearing system comprising said hearing device.

In one embodiment, the arrangement is comprised in said hearing device.

In one embodiment, there is at least one user control provided for each of the N parameters.

In one embodiment of the computer program product, said computer is comprised in a hearing system comprising said hearing device.

Further embodiments of arrangements and of computer program products correspond to embodiments of methods according to the invention.

The advantages of the arrangements and computer program products correspond to the advantages of corresponding methods.

Further preferred embodiments and advantages emerge from the description and the figures.

BRIEF DESCRIPTION OF THE DRAWINGS

Below, the invention is described in more detail by means of examples and the included drawings. The figures show.

The reference symbols used in the figures and their meaning are summarized in the list of reference symbols. The described embodiments are meant as examples and shall not confine the invention.

DETAILED DESCRIPTION OF THE INVENTION

Figure 1:
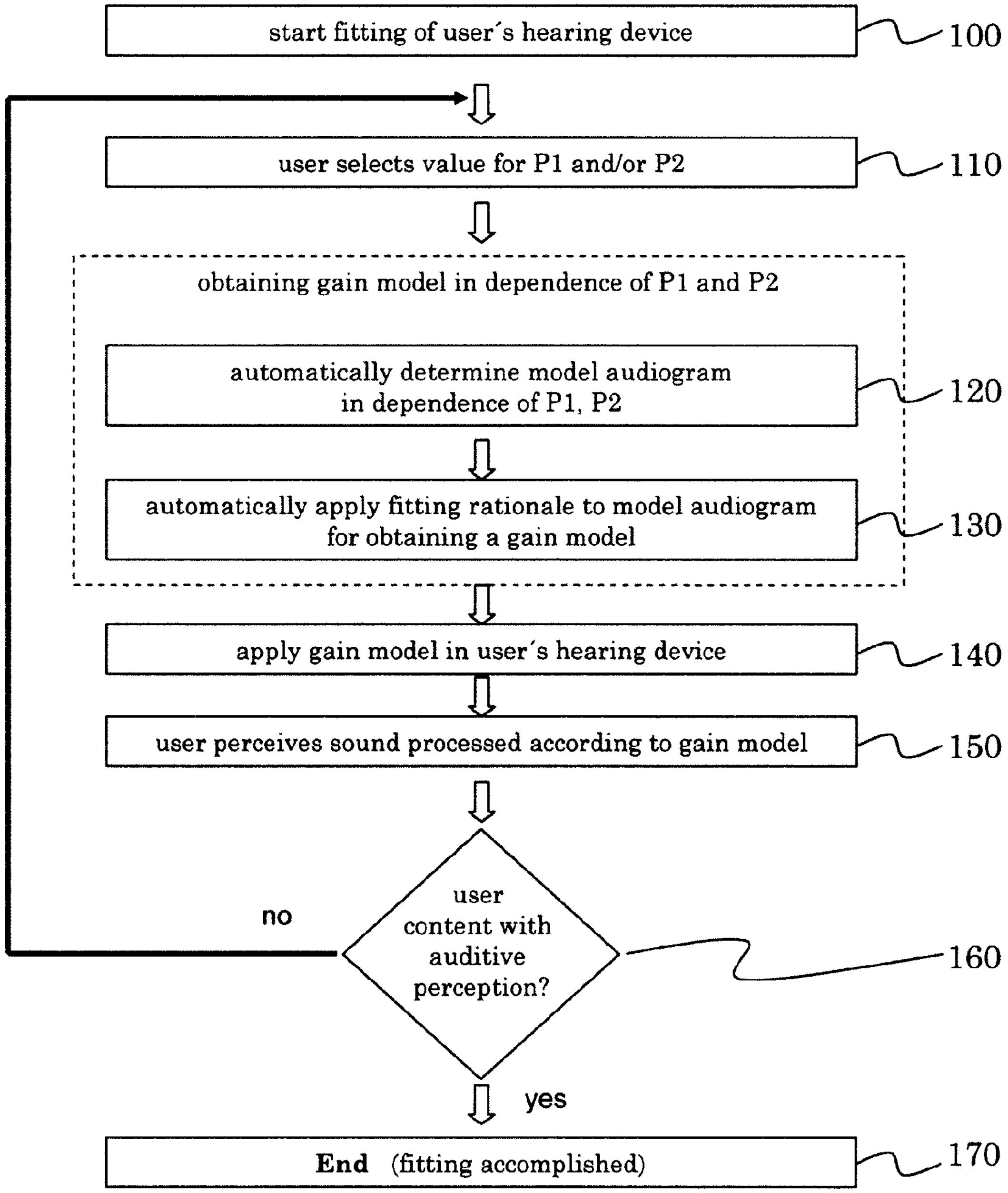
FIG. 1 a block diagram illustrating a method according to the invention.

FIG. 1 shows a block diagram illustrating a method according to the invention, i.e. of a method for adjusting a hearing device to the hearing preferences of a user of said hearing device. In step 100, the fitting of the hearing device is started. In step 110, the user selects settings for at least one parameter, typically by manipulating a user control of the hearing device or of a remote control belonging to the hearing device. In steps 120 and 130, a gain model is obtained in dependence of the selected parameter settings. E.g., first, a model audiogram is obtained in dependence of the selected parameter settings (step 120), and then, a fitting rationale, e.g., Phonak Digital or NAL-NL1, is applied to the model audiogram, so as to obtain a gain model (step 130).

The so-obtained gain model is then applied to the hearing device (step 140), so that the user can perceive sound processed using the gain model (step 150). For this, sounds from the surroundings (environmental sounds) can be used, but it is also possible to use test sounds, e.g., generated within the hearing device or within a hearing system comprising the hearing device.

If the user is content with how he perceives sound (step 160), i.e. content with the new gain model, the fitting procedure is or can be finished (step 170). If the is not content, it can be continued with step 110, i.e., the user will select at least one new parameter setting.

Figure 2:
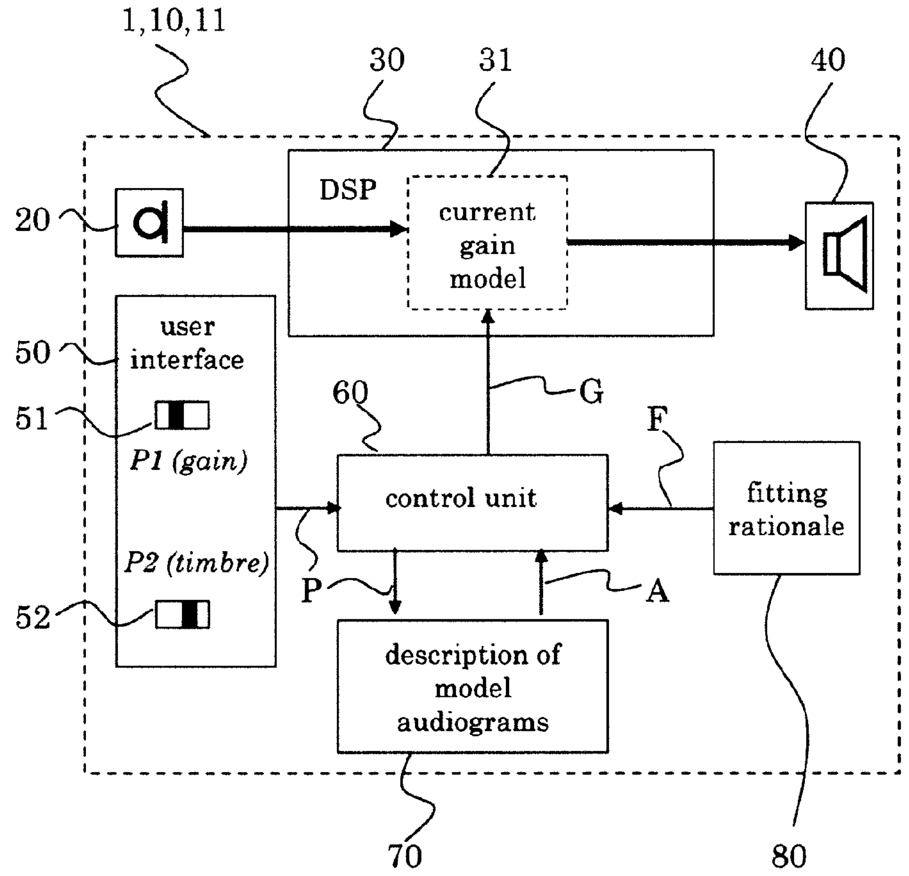
FIG. 2 a schematic illustration of an arrangement according to the invention, in particular in a hearing device.

FIG. 2 is a schematic illustration of an arrangement 1 according to the invention. The arrangement can be identical with a hearing system 10 comprising the hearing device 1 and can be identical with the hearing device 1.

The arrangement 1 comprises an input unit 20, e.g., a microphone, a signal processing unit 30 for processing audio signals received from the input unit 20, and an output unit, e.g., a loudspeaker, for providing the user with signals to be perceived by the user, typically sound waves.

The arrangement 1 furthermore comprises a user interface 50 operatable by the user and comprising several, e.g., two, user controls 51,52 such as toggles or sliders, a control unit 50, a storage unit 70 comprising data describing model audiograms and a storage unit 80 comprising data describing at least one fitting rationale.

The arrangement 1 can be used for carrying out a method as illustrated in FIG. 1, in the following way: The user wants to adjust the hearing device 1 to his hearing preferences, i.e. adjust the hearing device's transfer function, which is basically done by amending the gain model 31 realized in the signal processor 30. For this, the user manipulates user controls 51 and/or 52, which results in parameter settings P for two parameters P1 and P2 to which the user control 51 and 52, respectively, are assigned.

The parameters P1 and P2 can, e.g., be chosen (defined) such that adjusting P1 primarily is perceived as adjusting a gain or an overall volume, whereas adjustments of P2 would primarily result in timbre changes for signals perceived by the user. For example, when considering an audiogram of hearing loss values, the model audiograms—conventionally represented by a curve (actually several discrete points describing a curve) with the frequency on the x-axis and the hearing loss on the y-axis (with stronger hearing loss values below lighter hearing loss values)—could be comprised of an approximately horizontal approximately straight line for low frequencies up to a treshold frequency and, for frequencies above said treshold frequency, of an approximately straight or curved line with negative slope. Changing P1 could in this case basically shift the model audiogram parallel to the y-axis, whereas changing P2 could change said treshold frequency and/or said negative slope (more precisely its steepness and/or its shape).

The settings P of the parameters P1, P2 are passed on to the control unit 60, which uses them for obtaining in dependence thereof a model audiogram A (more precisely: data describing or representative of a model audiogram A) from storage unit 70. The audiogram may be represented by or comprise, e.g., ten to twenty values indicating a hearing loss or a most comfortable level for different frequencies.

Control unit 60 obtains data describing a fitting rationale from storage unit 80 and applies the fitting rationale to the audiogram A, so as to obtain a gain model G. The new gain model G or a gain model derived therefrom is then used in signal processing unit 30, and the user will perceive sound differently. Depending on whether parameter P1 or P2 has been changed more pronouncedly, the user will perceive sound more strongly changed in volume or more strongly changed in timbre (tonal balance), if the parameters P1, P2 are defined in the before-mentioned way.

Preferably, manipulations of the user interface will result in perceivable changes in the gain model 31 nearly immediately, preferably no more than 2 seconds or 1 second after a manipulation. Storing model audiograms and/or fitting rationales in form of, e.g., look-up tables, can help to reduce the time between a user interface manipulation and the onset of the use of a corresponding new gain model.

It is readily understood that the constituents of the arrangement shown in FIG. 2 are at least in part merely functional units, which of course can be arranged in various ways, e.g., two or more of them can be united in one physical unit, or one or more of them can be distributed over two or more physical units. As it is common today, many of these functions are realized in form of software anyway, which renders differentiations other than a functional differentiation little meaningful.

If the user interface 50 is comprised in a device of a hearing system 10 other than the hearing device 11, e.g., in a remote control, data would have to be transmitted, preferably in a wireless fashion, from the remote control to the hearing device 1. In order to save storage space and computing power in the hearing device 11, it could be advisable to comprise also control unit 60 and storage units 70 and 80 in the remote control, thus transmitting the gain model G from the remote control to the hearing device 11.

Figure 3:
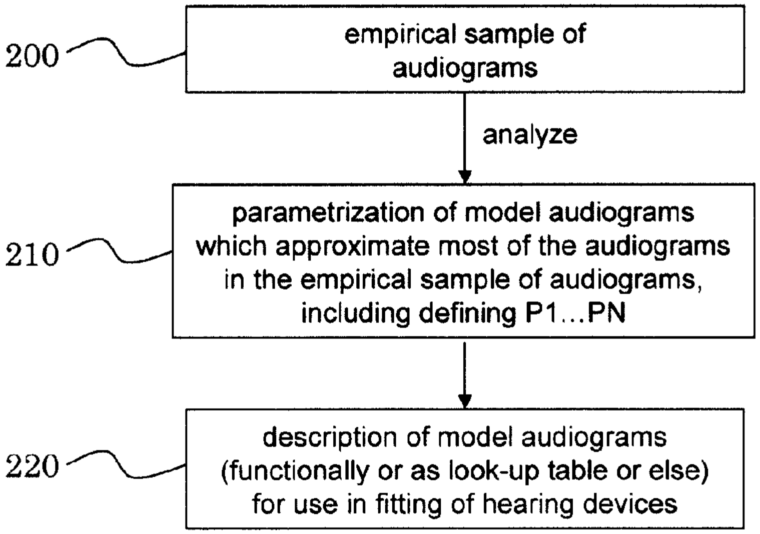
FIG. 3 a block diagram illustrating how suitable parameters and model audiograms can be found.

FIG. 3 is a block diagram illustrating an example of how suitable parameters and model audiograms can be found. It starts with an empirical sample of individual audiograms, comprising typically some 10000 audiograms of different individuals (step 200). That empirical sample can be analyzed, so as to find a parametrized form of audiograms, which are reasonable approximations of most of the audiograms in the empirical sample (step 210). Statistical methods and/or (mathematical) fitting software can be used to accomplish this. The number N of parameters can be pre-defined or result from the analysis of the empirical sample.

For example, it is possible to find a suitable parametrized form of (model) audiograms by trying to minimize the deviation between each audiogram in the empirical sample and the best-suiting model audiogram, e.g., by minimizing the following expression:

$$\Sigma(Ai-Am)^2$$

wherein Σ designates the sum over all audiograms Ai in the empirical sample, and Am is the best-suiting model audiogram for an audiogram Ai of the empirical sample.

It is also possible to use all the audiograms of the empirical sample as model audiograms, so that by varying the N parameters, a certain audiogram Ai of the empirical sample is selected from which a gain model is obtained by application of a fitting rationale. Or a specific selection of audiograms of the empirical sample can be used as model audiograms, e.g., audiograms that are typical for particularly many audiograms in the empirical sample.

It is, of course, possible to choose gain models directly by adjusting parameters P1, P2, i.e. without the intermediate step of actually obtaining an audiogram. In that case, gain models, which could be obtained by applying a fitting rationale to a model audiogram, would have to be available in a parametrized form depending on P1 and P2.

The invention makes it possible that a hearing device user selects one of a multitude of parametrized audiograms (model audiograms) by adjusting N parameters, e.g., by using user controls of the user's hearing system; and thereupon, the hearing device will use a gain model which is or at least can be obtained by applying a (fixed or selectable) fitting rationale to the selected model audiogram.

The invention can be used in real life situations and by the user himself without external help and without using devices external to the hearing system, such as a suitable computer plus software and calibrated audiologic equipment. No audiogram data have to be obtained from the user (no audiogram measurements). Not all (potential) hearing device users have access to a hearing device professional or the corresponding expertise, which are not everywhere available, so it is valuable to provide a fitting process that can be handled by the user, not requiring any specific knowledge.

LIST OF REFERENCE SYMBOLS

1 arrangement
10 hearing system
11 hearing device, hearing-aid device
20 input unit, acoustic-electric converter unit, microphone arrangement
30 signal processing unit, digital signal processor

31 currently used gain model, parameter storage
40 output unit, electric-acoustic converter unit, loudspeaker
50 user interface
51 user control, toggle
52 user control, toggle
60 control unit, controller
70 storage unit
80 storage unit
100 . . . 220 steps
A audiogram, data representative of audiogram
F fitting rationale, data representative of fitting rationale
G gain model, data representative of gain model
P parameter settings, values assigned to parameters

What is claimed is:

1. A method for adjusting a hearing device to the hearing preferences of a user of said hearing device, said method comprising the steps of a) the user adjusting at least one of N user adjustable hearing device parameters;

b) automatically selecting a model audiogram, the selection being dependent on said N user adjustable hearing device parameters and independent of existing audiogram values measured for said user; and c) automatically applying a fitting rationale to the selected model audiogram to obtain a gain model for the hearing device.

2. The method according to claim 1, comprising the step of d) processing a sound signal in said hearing device according to said gain model or a gain model derived therefrom.

3. The method according to claim 2, wherein step d) is carried out automatically after step c).

4. The method according to one of the preceding claims, wherein $2 \leqq N \leqq 4$.

5. The method according to claim 1, wherein said model audiogram is an approximation to an audiogram occurring in a pre-defined empirical sample of individual audiograms.

6. The method according to claim 5, wherein a definition of at least one of said N user adjustable hearing device parameters is derived based upon a statistical analysis of said predefined empirical sample of individual audiograms.

7. The method according to claim 1, further comprising the step of obtaining data from a look-up table, wherein the data represents characteristics of: the fitting rationale, the model audiogram, or the gain model.

8. The method according to claim 1, which is carried out using solely devices of a hearing system to which said hearing device belongs.

9. The method according to claim 1, wherein the model audiogram is selected from a plurality of audiograms stored in a storage unit of the hearing device.

10. A system for adjusting a hearing device to the hearing preferences of a user of said hearing device, comprising said hearing device;

at least one user control for adjusting N user adjustable hearing device parameters;

a control unit adapted to automatically select a model audiogram, the selection being dependent on said N user adjustable hearing device parameters and independent of existing audiogram values measured for said user; and automatically apply a fitting rationale to the selected model audiogram to obtain a gain model for the hearing device.

11. The system according to claim 10, which is comprised in a hearing system comprising said hearing device.

12. The system according to claim 10, which is comprised in said hearing device.

13. A non-transitory computer readable storage medium storing program code for adjusting a hearing device to the hearing preferences of a user of said hearing device, the program code causing a computer to perform the steps of A) receiving user input indicative of a requested adjustment of N user adjustable hearing device parameters;

B) automatically selecting a model audiogram, the selection being dependent on said N user adjustable hearing device parameters and independent of existing audiogram values measured for said user; and C) automatically applying a fitting rationale to the selected model audiogram to obtain a gain model for the hearing device.

14. The non-transitory computer readable storage medium according to claim 13, wherein said computer is comprised in a hearing system comprising said hearing device.

15. The arrangement according to claim 10, further comprising a storage unit of the hearing device storing a plurality of audiograms from which the control unit selects the model audiogram.

* * * * *

UNITED STATES PATENT AND TRADEMARK OFFICE

CERTIFICATE OF CORRECTION

PATENT NO. : 8,412,495 B2
APPLICATION NO. : 12/674985
DATED : April 2, 2013
INVENTOR(S) : Michael Boretzki It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 487 days.

Signed and Sealed this
First Day of September, 2015

Michelle K. Lee
*Director of the United States Patent and Trademark Office*